United States Patent
Shibayama et al.

(10) Patent No.: US 10,419,663 B2
(45) Date of Patent: Sep. 17, 2019

(54) SEMICONDUCTOR DEVICE, ENCODING CONTROL METHOD AND CAMERA DEVICE

(71) Applicant: Renesas Electronics Corporation, Tokyo (JP)

(72) Inventors: Tetsuya Shibayama, Tokyo (JP); Toshiyuki Kaya, Tokyo (JP); Seiji Mochizuki, Tokyo (JP); Ryoji Hashimoto, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 123 days.

(21) Appl. No.: 15/421,503

(22) Filed: Feb. 1, 2017

(65) Prior Publication Data

US 2017/0264820 A1 Sep. 14, 2017

(30) Foreign Application Priority Data

Mar. 14, 2016 (JP) ................................ 2016-049101

(51) Int. Cl.
*H04N 5/232* (2006.01)
*H04N 19/124* (2014.01)
(Continued)

(52) U.S. Cl.
CPC ....... *H04N 5/23229* (2013.01); *H04N 19/115* (2014.11); *H04N 19/124* (2014.11);
(Continued)

(58) Field of Classification Search
CPC .... H04N 19/149; H04N 19/13; H04N 19/115; H04N 19/61; H04N 19/60; H04N 19/132
See application file for complete search history.

(56) References Cited

U.S. PATENT DOCUMENTS 6,061,404 A * 5/2000 Yonemitsu ....... G11B 20/10527
375/242
7,151,856 B2 12/2006 Uchibayashi et al.
(Continued)

FOREIGN PATENT DOCUMENTS

| JP | 10-208393 A | 8/1998 |
| JP | 2004-007619 A | 1/2004 |
| JP | 2010-288166 A | 12/2010 |

OTHER PUBLICATIONS

Japanese Notification of Reasons for Refusal issued in corresponding Japanese Patent Application No. 2016-049101, dated Jul. 2, 2019, with English Translation.

*Primary Examiner* — Cynthia Segura
(74) *Attorney, Agent, or Firm* — McDermott Will & Emery LLP

(57) ABSTRACT

A semiconductor device includes: an encoding processing unit that stores an encoded stream of an input data that is encoded based on the specified encoding control information; a buffer management unit that calculates the transmission buffer occupancy indicating the amount of data stored in a transmission buffer according to the generated data amount, and the reception buffer occupancy indicating the amount of data stored in a reception buffer, which is the destination of the encoded stream; and a control information specifying unit that, when the transmission buffer occupancy is equal to or less than a first threshold, specifies the encoding control information based on the reception buffer occupancy, and when the transmission buffer occupancy is greater than the first threshold, specifies the encoding control information to further reduce the generated data amount than in the case of equal to or less than the first threshold, to the encoding processing unit.

17 Claims, 10 Drawing Sheets

(51) Int. Cl.
*H04N 19/20* (2014.01)
*H04N 19/159* (2014.01)
*H04N 19/176* (2014.01)
*H04N 19/172* (2014.01)
*H04N 19/13* (2014.01)
*H04N 19/149* (2014.01)
*H04N 19/15* (2014.01)
*H04N 19/115* (2014.01)
*H04N 19/60* (2014.01)
*H04N 19/61* (2014.01)
*H04N 19/132* (2014.01)
*H04N 19/14* (2014.01)
*H04N 19/137* (2014.01)
*H04N 19/142* (2014.01)
*H04N 19/152* (2014.01)
*H04N 19/182* (2014.01)
*H04N 19/184* (2014.01)
*H04N 19/85* (2014.01)

(52) U.S. Cl.
CPC ........... *H04N 19/13* (2014.11); *H04N 19/132* (2014.11); *H04N 19/137* (2014.11); *H04N 19/14* (2014.11); *H04N 19/142* (2014.11); *H04N 19/149* (2014.11); *H04N 19/15* (2014.11); *H04N 19/152* (2014.11); *H04N 19/159* (2014.11); *H04N 19/172* (2014.11); *H04N 19/176* (2014.11); *H04N 19/182* (2014.11); *H04N 19/184* (2014.11); *H04N 19/20* (2014.11); *H04N 19/60* (2014.11); *H04N 19/61* (2014.11); *H04N 19/85* (2014.11)

(56) References Cited

U.S. PATENT DOCUMENTS

2005/0281140 A1* 12/2005 Verbakel .......... G11B 20/00007
369/30.09
2010/0316120 A1    12/2010 Abe et al.
2011/0292995 A1* 12/2011 Kubota ............ H04N 21/23424
375/240.02
2018/0070086 A1*  3/2018 Hasegawa .............. H04N 5/225

* cited by examiner

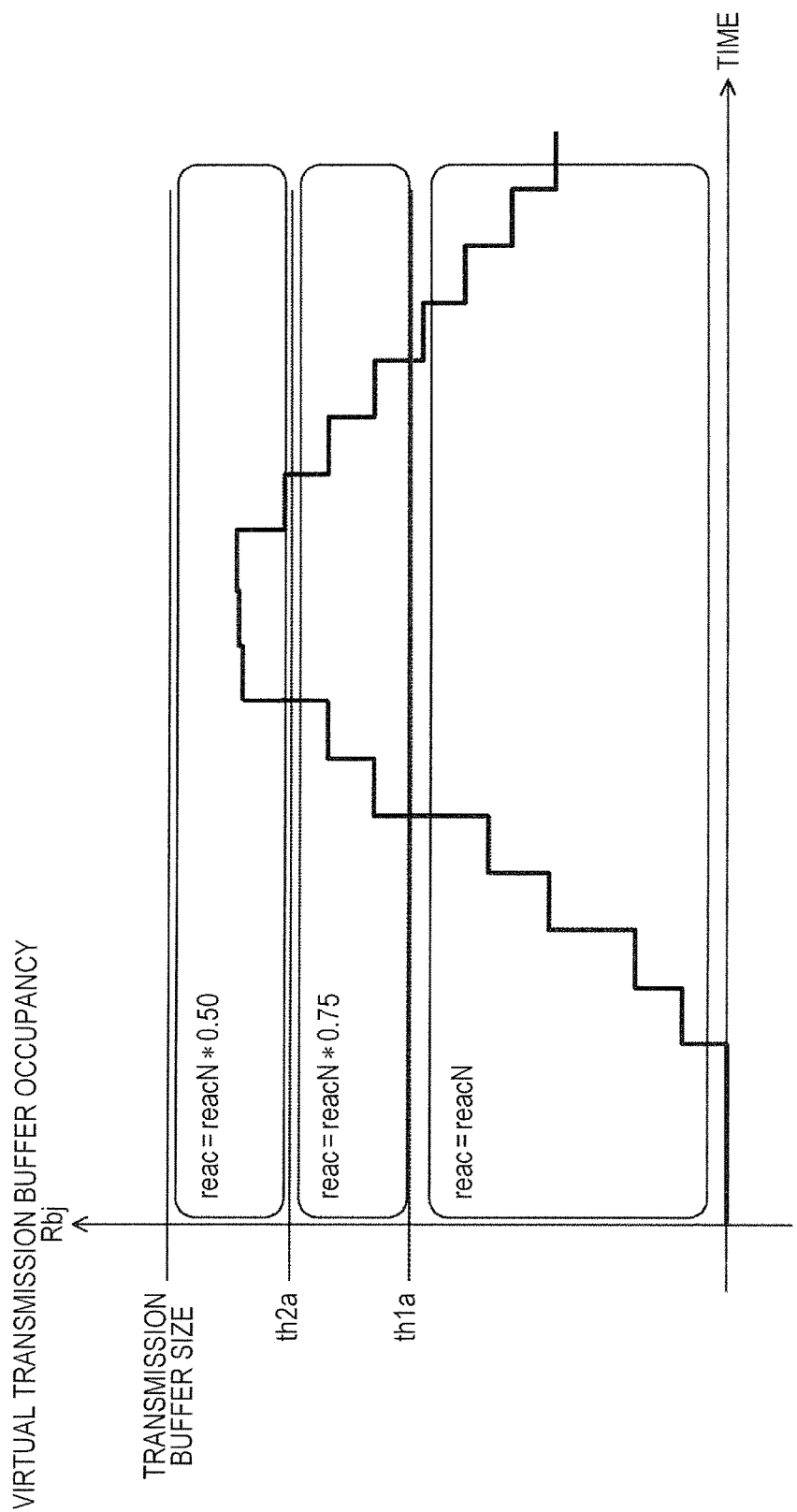

SEMICONDUCTOR DEVICE, ENCODING CONTROL METHOD AND CAMERA DEVICE

CROSS-REFERENCE TO RELATED APPLICATIONS

The disclosure of Japanese Patent Application No. 2016-049101 filed on Mar. 14, 2016 including the specification, drawings and abstract is incorporated herein by reference in its entirety.

BACKGROUND

The present invention relates to a semiconductor device, an encoding control method, and a camera device. For example, the present invention relates to a semiconductor device, an encoding control method, and a camera device that are associated with encoding of input data.

In recent years, semiconductor devices have been widely used to encode video data by controlling the subsequent encoding rate according to the results of the last encoding. As a technique for encoding control, for example, Patent Document 1 (Japanese Unexamined Patent Application Publication No. Hei 10 (1998)-208393) is known.

Patent Document 1 discloses a technique for a video encoder that records a bit stream of encoded video signals into an optical disk. The video encoder according to Patent Document 1 is configured such that a video encoder encodes an input image data based on a specified amount of bits to be encoded, and stores the encoded bit stream, which is the encoding result, into an encoder buffer (a transmission buffer). Here, when recording to the recording medium is temporarily interrupted due to an external impact or the like, the output from the encoder buffer is temporarily stopped. At this time, a buffer management circuit calculates the occupancy of data in the encoder buffer, based on the amount of encoded bits as well as the output bit rate in the encoder buffer. Then, a rate controller controls the encoded bit rate in the video encoder according to the occupancy.

SUMMARY

In Patent Document 1, it is assumed that the transmission buffer size is equal to or more than the size of a buffer (reception buffer) that stores data before being recorded in the optical disk. This assumption leads to a problem that it is difficult to perform the encoding control flexibly if a sufficient transmission buffer size is not provided in a device such as an in-vehicle camera.

Other objects, advantages and novel features of the invention will become more apparent from the following detailed description of the invention when taken in conjunction with the accompanying drawings.

According to an embodiment, a semiconductor device is to control encoding by taking into account both the transmission buffer occupancy and the reception buffer occupancy.

According to the embodiment described above, it is possible to control encoding flexibly.

BRIEF DESCRIPTION OF THE DRAWINGS

FIG. 11 is a diagram illustrating the relationship between the virtual transmission buffer occupancy and the encoding mode.

DETAILED DESCRIPTION

Figure 1:
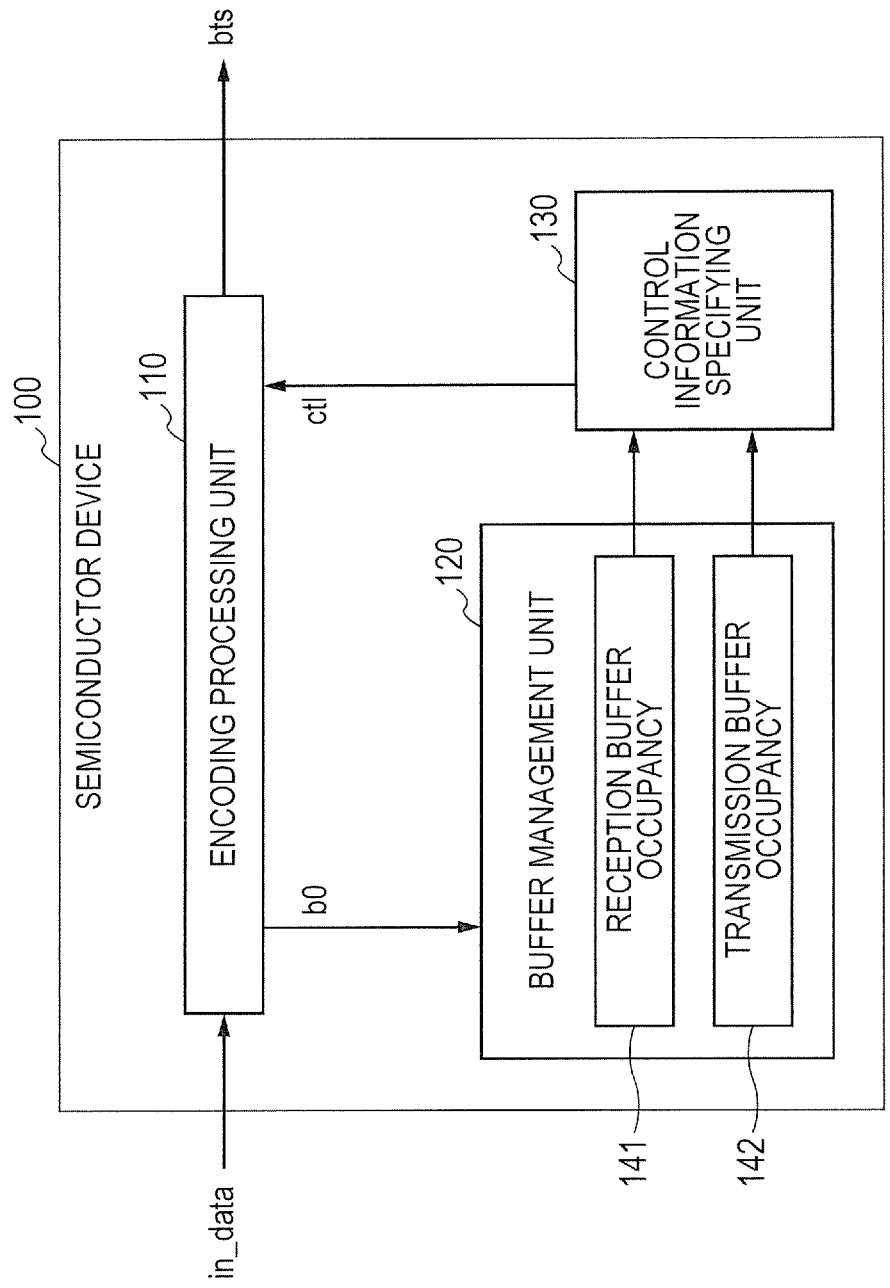
FIG. 1 is a block diagram illustrating a configuration of a semiconductor device according to a first embodiment.

Hereinafter, a specific example to which the above described means for solving the problem is applied will be described with reference to the accompanying drawings. In each of the figures, like elements are designated by like reference numerals and the repetitive description is omitted, as appropriate, in order to clarify the description.

In the embodiment described below, the detailed description of the invention will be divided into a plurality of sections or embodiments when required as a matter of convenience. However, these sections or embodiments are not irrelevant to each other unless otherwise stated, and one serves as a variation, a detailed description, or a supplementary explanation of the whole or part of the other. Also, in the embodiment described below, when referring to the number of elements (including the number of pieces, numerical value, amount, range, etc.), the number of elements is not limited to a specific number unless otherwise stated or unless it is clearly limited to a specific number in principle. The number of elements can be greater or smaller than the specified number.

Further, in the embodiment described below, the components (including operation steps, etc.) are not necessarily needed, unless otherwise stated or unless they should be clearly needed in principle. Similarly, in the embodiment described below, when referring to the shape, the positional relationship, or other characteristics of the components, those substantially close or similar to the shape or other characteristics are included unless otherwise stated or unless they should not clearly be in principle. This is true for the number or other attributes (including the number of pieces, numerical value, amount, range, etc.).

Here, the background of how the following embodiment was conceived will be described. First, the above described Patent Document 1 relates to an approach that, when a processing delay occurs on the reception side of an encoding stream, controls the encoding rate so that a transmission buffer can endure within the free space of the transmission buffer (so that the transmission buffer does not overflow). Thus, in Patent Document 1, it is assumed that the transmission buffer size is equal to or more than the reception buffer size.

However, with the recent requirement for waterproofing, there are increasing needs for reducing the size of the equipment, such as in-vehicle camera and monitoring camera, by packaging the whole camera module. In this case, it is difficult to mount a large capacity external memory such as a dynamic random access memory (DRAM) in the camera module. In addition, like the case of the in-vehicle camera, low delay is required when a photographed image is displayed on a screen near the driver's seat during driving. Consequently, such problems may not be solved under the assumption of Patent Document 1.

Further, in Patent Document 1, the encoding control is based on the occupancy of the transmission buffer, so that it is difficult to maintain the accuracy of encoding the image by temporarily increasing the encoding rate, for example, in the case in which a rapid change occurs locally in the input video image.

Thus, embodiments for solving the above problems are described below.

First Embodiment

FIG. 1 is a block diagram illustrating a configuration of a semiconductor device 100 according to a first embodiment. The semiconductor device 100 is designed to encode an input data in_data of an image or the like, and output an encoded stream (bit stream) bts. Note that the input data in_data can be picture (macroblock) data which is a part of image data. Further, it is assumed that the output encoded stream bts is once stored in a transmission buffer (not shown), transferred and stored in a reception buffer (not shown), read from the reception buffer, and then is decoded. The semiconductor device 100 includes an encoding processing unit 110, a buffer management unit 120, and a control information specifying unit 130.

The encoding processing unit 110 stores the encoded stream bts, which is the encoded input data in_data, into the transmission buffer based on specified encoding control information ct1. The buffer management unit 120 calculates both reception buffer occupancy 141 and transmission buffer occupancy 142 in accordance with the amount of data generated in the encoding process. The reception buffer occupancy 141 is the numerical information that shows the amount of data stored in the reception buffer which is the destination of the encoded stream bts. Further, the transmission buffer occupancy 142 is the numerical information that shows the amount of data stored in the transmission buffer. In other words, the buffer management unit 120 does not have a buffer to which the encoded stream bts is actually stored, but has virtual buffers that represent each buffer. For this reason, the reception buffer occupancy 141 can also be referred to as "virtual reception buffer occupancy", and the transmission buffer occupancy 142 can also be referred to as "virtual transmission buffer occupancy".

The control information specifying unit 130 specifies the encoding control information ct1 to the encoding processing unit 110. Here, when the transmission buffer occupancy 142 is equal to or less than a first threshold, the control information specifying unit 130 specifies the encoding control information ct1 based on the reception buffer occupancy 141. On the other hand, when the transmission buffer occupancy 142 is grater than the first threshold, the control information specifying unit 130 specifies the encoding control information ct1 to further reduce a generated data amount b0 than in the case of equal to or less than the first threshold.

Here, when "a value greater by a predetermined value than the first threshold" is defined as a second threshold, "the case in which the transmission buffer occupancy is greater than the first threshold" may also be interpreted as "the case in which the transmission buffer occupancy is equal to or more than the second threshold".

Further, "the encoding control information ct1" is the control information when the encoding process is performed by the encoding processing unit 110. Preferably "the encoding control information ct1" is, for example, the quantization value used in the encoding process, or the information that specifies the encoding mode (namely, the specification information that instructs the encoding processing unit 110 to perform the encoding process using a specific quantization value).

Further, "the encoding control information ct1 to further reduce the generated data amount b0 than in the case of equal to or less than the first threshold" shows, for example, that the quantization value in "the case in which the transmission buffer occupancy is greater than the first threshold" is greater than the quantization value in "the case in which the transmission buffer occupancy is equal to or less than the first threshold".

As described above, the semiconductor device 100 according to the first embodiment controls the encoding bit rate by using both the occupancy of the virtual reception buffer and the occupancy of the virtual transmission buffer. Then, the semiconductor device 100 typically operates to satisfy the target bit rate that is set based on the occupancy of the virtual reception buffer. In other words, the semiconductor device 100 controls the encoding bit rate by allocating a lot of bits when the occupancy of the virtual reception buffer is available, and when the occupancy of the virtual reception buffer is not available, controls the encoding bit rate by reducing the number of allocated bits. Further, when the occupancy of the virtual reception buffer is available, the semiconductor device 100 operates to permit an instantaneous increase in the bit rate in order to encode the image with high quality.

Here, when the size of the transmission buffer is very small compared to the size of the reception buffer, the input rate to the transmission buffer is instantaneously increased. This leads to a problem that the transmission buffer is broken depending on the size of the transmission buffer. Thus, in the first embodiment, the bit rate control is first performed based on the occupancy of the virtual reception buffer in the normal operation to flexibly deal with the complexity of the input image. Then, when the occupancy of the virtual transmission buffer, which represents the transmission buffer, reaches an amount exceeding a predetermined threshold, the encoding control is performed in the direction of reducing the amount of encoding even if the reception buffer has available space, while high quality image encoding is maintained. In other words, in the first embodiment, the encoding control is performed by using two virtual buffer occupancies. Thus, even in the case of a system with a small transmission buffer, it is possible to perform the encoding control that reduces the overflow of the transmission buffer.

As described above, according to the first embodiment, it is possible to flexibly perform the encoding control and maintain the encoding accuracy of the image, by temporarily increasing the encoding rate when there is a local change in the input image, while preventing the transmission buffer from being broken.

First Example

Next, a first example of the first embodiment will be described.

Figure 2:
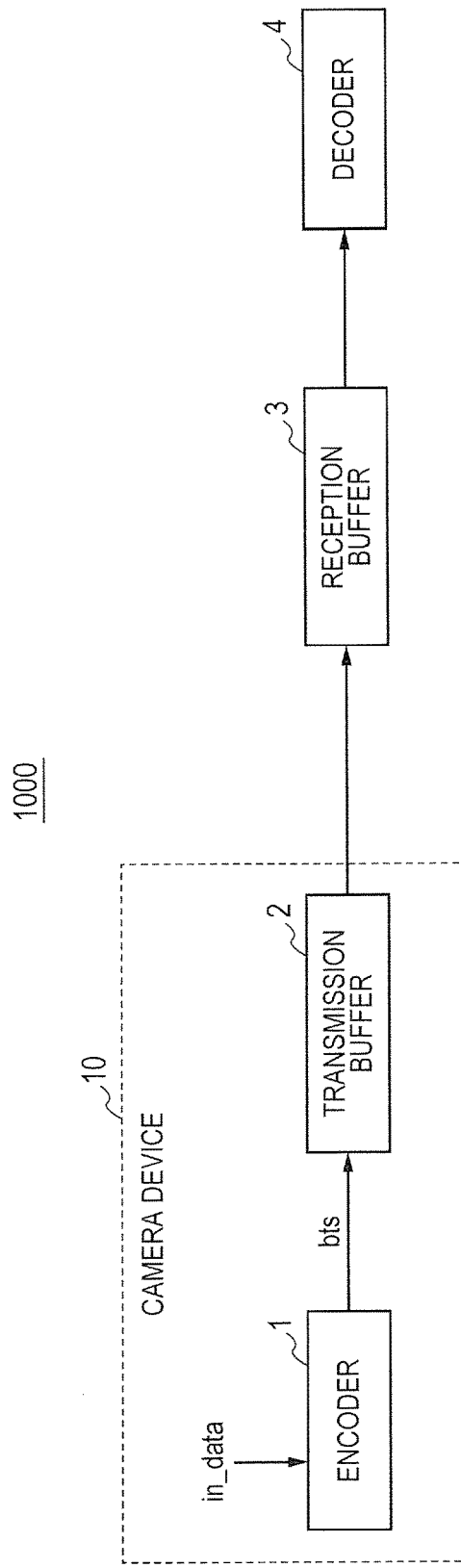
FIG. 2 is a block diagram illustrating a configuration of an encoding processing system according to the first embodiment.

FIG. 2 is a block diagram illustrating a configuration of an encoding processing system 1000 according to the first example. The encoding processing system 1000 includes an encoder 1, a transmission buffer 2, a reception buffer 3, and a decoder 4. Here, the transmission buffer 2 and the reception buffer 3 are coupled by a transmission path such as a communication line. The encoder 1 is an example of the semiconductor device 100 described above. Further, it is assumed that the encoder 1 and the transmission buffer 2 are for example included in a camera device 10. However, the present invention is not limited to that. The encoder 1 encodes a video image such as a photographic image taken by a camera (not shown), as the input data in_data, into the encoded stream bts such as H.264. Then, the encoder 1 stores the encoded stream bts in the transmission buffer 2. The camera device 10 transfers the encoded stream bts stored in the transmission buffer 2 to the reception buffer 3 through the transmission path. Then, the decoder 4 reproduces and displays the video image by reading the encoded stream bts from the reception buffer side to decode the encoded stream bts, and outputting to a screen (not shown), or the like.

Figure 3:
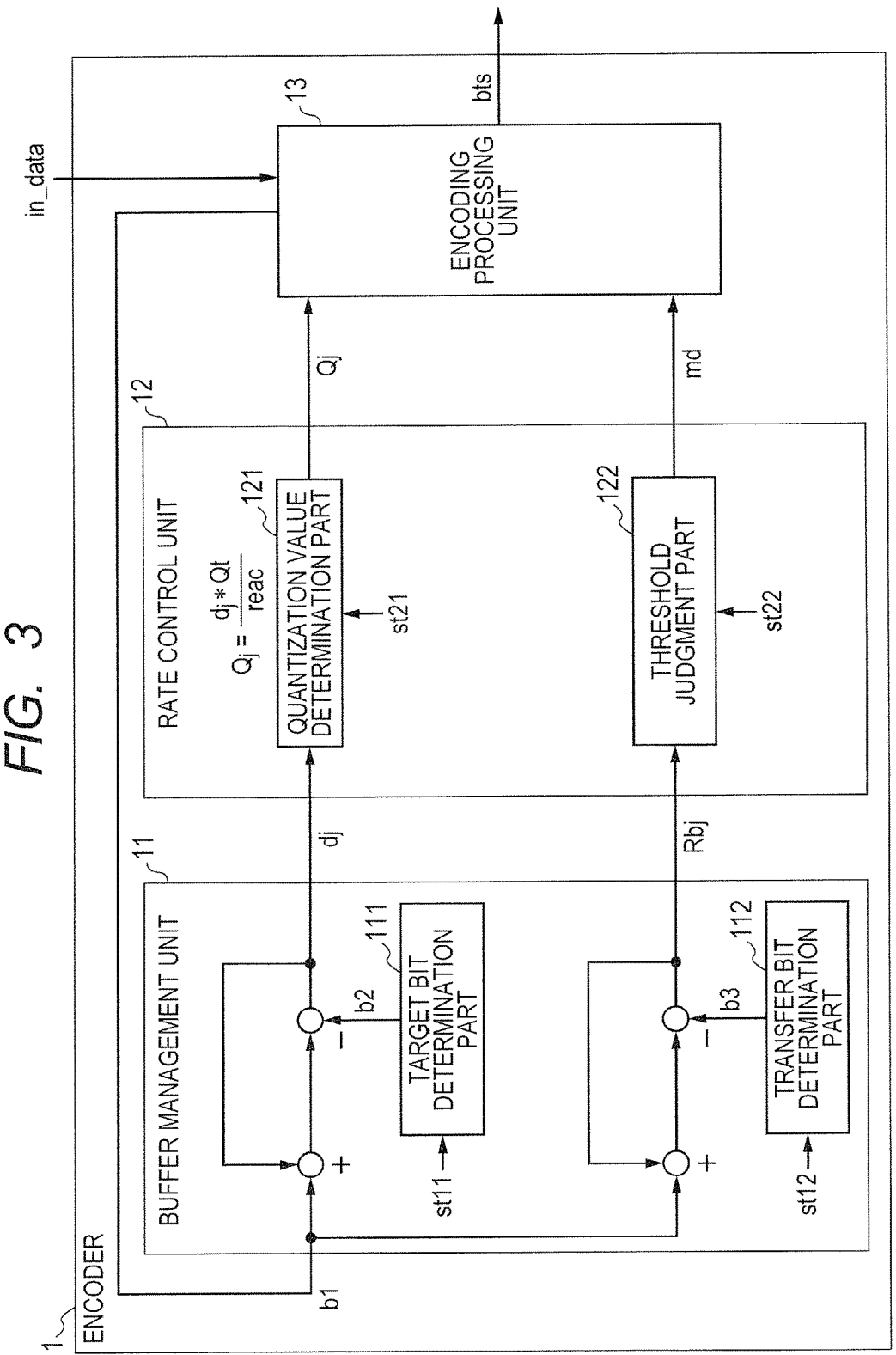
FIG. 3 is a block diagram illustrating a configuration of an encoder according to the first embodiment.

FIG. 3 is a block diagram illustrating a configuration of the encoder 1 according to the first example. The encoder 1 includes a buffer management unit 11, a rate control unit 12, and an encoding processing unit 13. The encoding processing unit 13 is an example of the encoding processing unit 110 described above. The encoding processing unit 13 performs encoding based on the quantization value Qj and the encoding mode md. Then, the encoding processing unit 13 outputs the encoded stream bts to the transmission buffer 2. Note that the quantization value Qj and the encoding mode md are examples of the encoding control information ctl described above. Further, the encoding processing unit 13 outputs the generated bit amount b1 in the encoding process to the buffer management unit 11.

The buffer management unit 11 is an example of the buffer management unit 120 described above. The buffer management unit 11 calculates both virtual reception buffer occupancy dj and virtual transmission buffer occupancy Rbj by using the generated bit amount b1 from the encoding processing unit 13, and outputs to the rate control unit 12. Here, the buffer management unit 11 includes, as the internal configuration, a target bit determination part 111 and a transfer bit determination part 112.

In the target bit determination part 111, a predetermined set value st11 is set in advance by the user or other means. Then, the target bit determination part 111 determines a target bit amount b2 based on the set value st11, and outputs the target bit amount b2. The buffer management unit 11 calculates a new virtual reception buffer occupancy dj by adding the generated bit amount b1 and the last virtual reception buffer occupancy dj and by subtracting the target bit amount b2.

Figure 4:
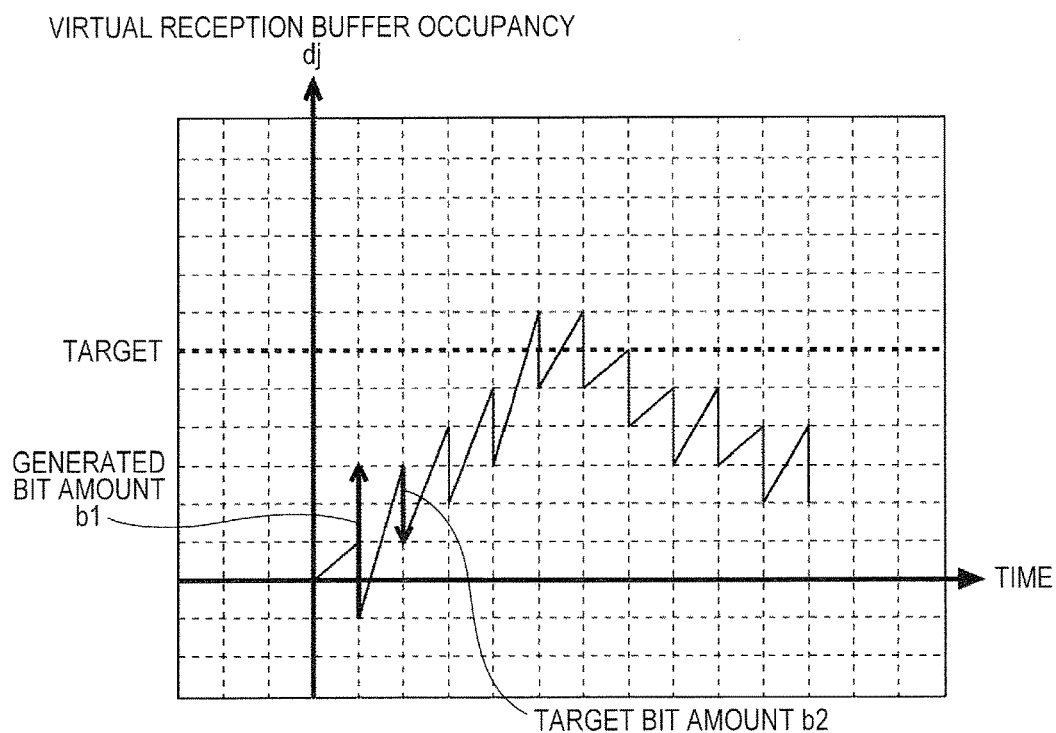
FIG. 4 is a diagram illustrating an example of the change in the virtual reception buffer occupancy according to the first embodiment.

Here, FIG. 4 is a diagram illustrating an example of the change in the virtual reception buffer occupancy according to the first example. As shown in FIG. 4, the virtual reception buffer occupancy dj increases or decreases depending on the generated bit amount b1 and the target bit amount b2 per unit time.

Return to FIG. 3 to continue the description.

Further, in the transfer bit determination part 112, a predetermined set value st12 is set in advance by the user or other means. Then, the transfer bit determination part 112 determines a transfer bit amount b3 based on the set value st12, and outputs the determined transfer bit amount b3. Note that the set value st12 includes the transmission buffer information which is the information specific to the system. The transmission buffer information includes the size of the transmission buffer, the transfer rate, and the like. The buffer management unit 11 calculates a new virtual transmission buffer occupancy Rbj by adding the generated bit amount b1 and the last virtual transmission buffer occupancy Rbj and by subtracting the transfer bit amount b3.

Figure 5:
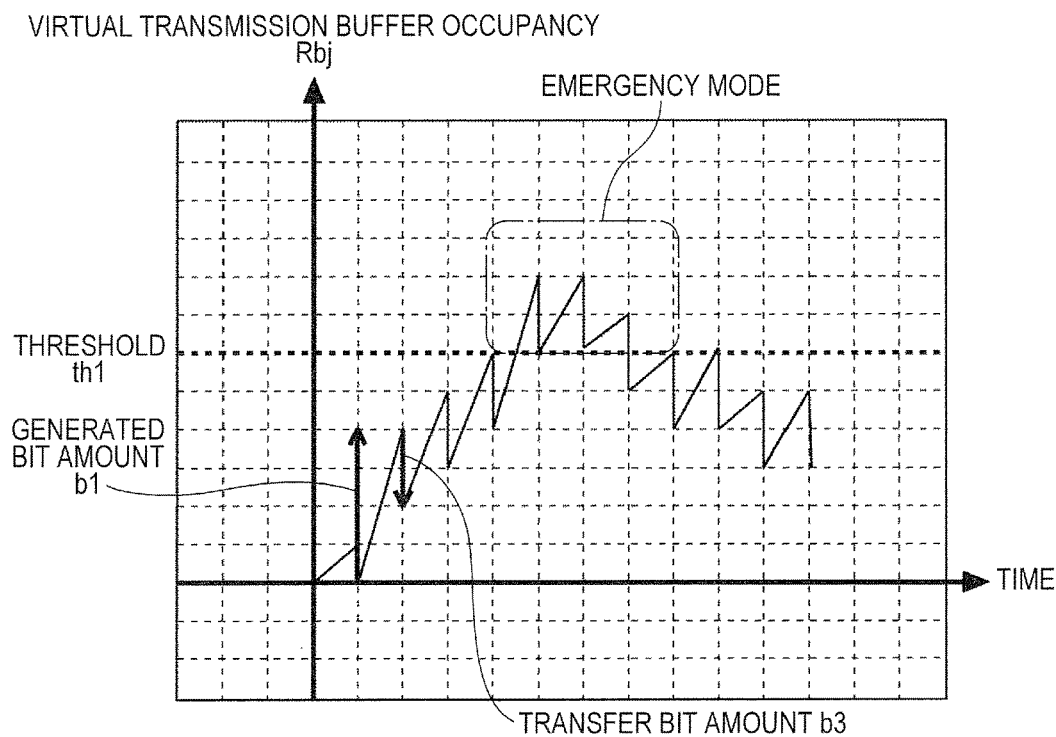
FIG. 5 is a diagram illustrating an example of the change in the virtual transmission buffer occupancy according to the first embodiment.

Here, FIG. 5 is a diagram illustrating an example of the change in the virtual transmission buffer occupancy according to the first example. As shown in FIG. 5, the virtual transmission buffer occupancy Rbj increases or decreases depending on the generated bit amount b1 and the transfer bit amount b3, per unit time.

Return to FIG. 3 to continue the description.

The rate control unit 12 is an example of the control information specifying unit 130 described above. The rate control unit 12 outputs the quantization value Qj and the encoding mode md to the encoding processing unit 13 by using the virtual reception buffer occupancy dj and the virtual transmission buffer occupancy Rbj, which are received from the buffer management unit 11. Here, the rate control unit 12 includes, as the internal configuration, a quantization value determination part 121 and a threshold judgement part 122.

In the quantization value determination part 121, a predetermined set value st21 is set in advance by the user or other means. Note that the set value st21 includes, for example, the width of the quantization width, a reaction parameter, and the like. However, the present invention is not limited to these examples. Then, the quantization value determination part 121 calculates a quantization value Qj by using the virtual reception buffer occupancy dj from the buffer management unit 11 and by using the set value st21. Then, the quantization value determination part 121 outputs the calculated quantization value Qj to the encoding processing unit 13. For example, the quantization value determination part 121 calculates a quantization value Qj by using the following equation (1). Here, Qt is the quantization width, which is, for example, a value from 0 to 51, and reac is the reaction parameter.

$$Qj=(dj*Qt)/\text{reac} \qquad \text{Equation (1)}$$

Further, the threshold judgement part 122 performs a predetermined determination by using the virtual transmission buffer occupancy Rbj from the buffer management unit 11 and by using the set value st22. Then, the threshold judgment part 122 outputs the encoding mode md to the encoding processing unit 13. More specifically, the threshold judgement part 122 determines whether the virtual transmission buffer occupancy Rbj is greater than a predetermined threshold th1. Then, when the virtual transmission buffer occupancy Rbj is equal to or less than the threshold th1, the threshold judgement part 122 outputs the encoding mode md as "normal encoding mode". On the other hand, when the virtual transmission buffer occupancy Rbj is greater than the threshold th1, the threshold judgment part 122 outputs the encoding mode md as "emergency mode". Here, "emergency mode" is the mode to perform an encoding that can most reduce the generated data amount within a range without departing from the specifications of the standard. Note that "emergency mode" may also be referred to as "minimum bit encoding mode".

When the encoding mode md from the rate control unit 12 indicates "normal encoding mode", the encoding processing unit 13 encodes the input data in_data based on the quantization value Qj received from the rate control unit 12. On the other hand, when the encoding mode md from the rate control unit 12 indicates "emergency mode", the encoding processing unit 13 encodes the input data in_data based on the quantization value that is set in advance. Here, the predetermined quantization value is, for example, a quantization value that minimizes the amount of bits generated in the encoding process. In this way, it is possible to appropriately adjust the generated bit amount with respect to the input data in_data.

Figure 6:
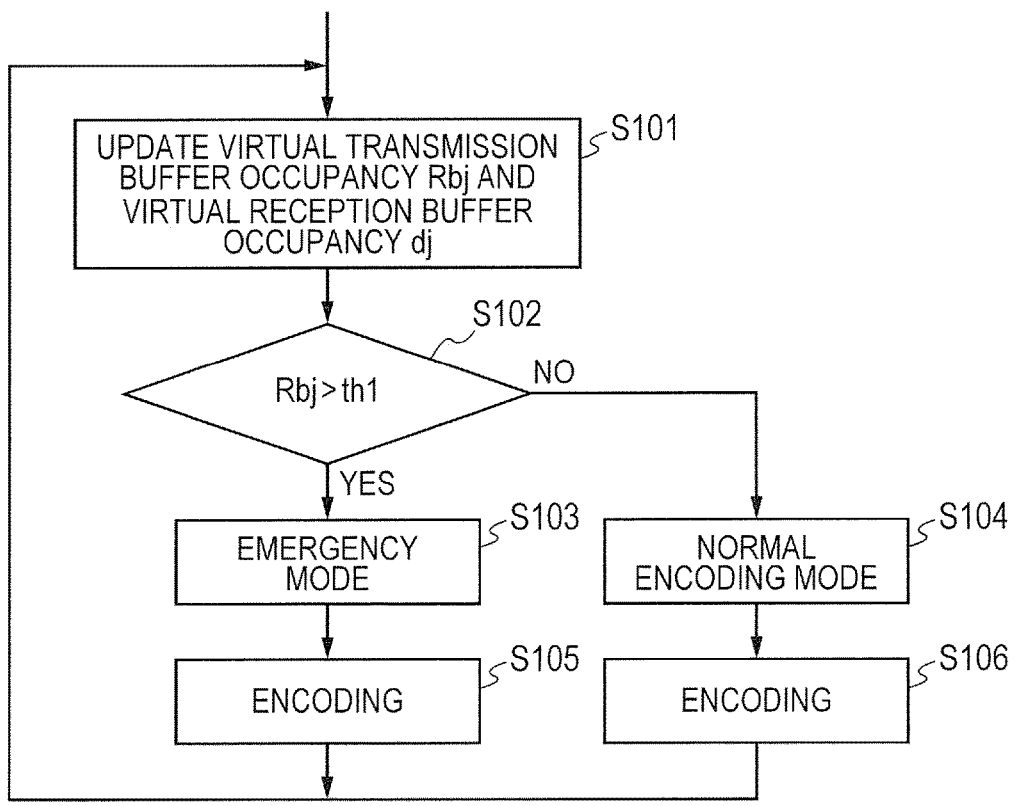
FIG. 6 is a flow chart illustrating the flow of an encoding control method according to the first embodiment.

FIG. 6 is a flow chart illustrating the flow of an encoding control method according to the first example. First, the buffer management unit 11 updates the virtual transmission buffer occupancy Rbj and the virtual reception buffer occupancy dj (S101). Next, the threshold judgement part 122 determines whether the virtual transmission buffer occupancy Rbj is greater than the threshold th1 (S102). When it is determined that the virtual transmission buffer occupancy Rbj is greater than the threshold th1 (YES in S102), the threshold judgement part 122 sets the encoding mode md to "emergency mode" and outputs to the encoding processing unit 13 (S103). Then, the encoding processing unit 13 encodes the input data in_data based on the predetermined quantization value (S105).

On the other hand, in step S102, when it is determined that the virtual transmission buffer occupancy Rbj is equal to or less than the threshold th1 (NO in S102), the threshold judgement part 122 sets the encoding mode md to "normal encoding mode" and outputs to the encoding processing unit 13 (S104). Then, the encoding processing unit 13 encodes the input data in_data based on the quantization value Qj received from the quantization value determination part 121 (S106). Note that it is assumed that the quantization value determination part 121 calculates the quantization value Qj in parallel with the threshold judgement part 122.

For the reasons described above, the first example can also be expressed as follows. That is, when the virtual transmission buffer occupancy Rbj is equal to or less than the threshold th1, the control information specifying unit calculates the encoding control information based on the virtual reception buffer occupancy dj, and specifies the calculated encoding control information to the encoding processing unit. On the other hand, when the virtual transmission buffer occupancy Rbj is greater than the threshold th1, the control information specifying unit specifies the predetermined value as the encoding control information to the encoding processing unit.

As described above, according to the first example, it is possible to appropriately control the encoding according to the reception buffer occupancy as long as the transmission buffer occupancy is available. In other words, since the encoding control is performed based on the virtual reception buffer occupancy in the normal operation, it is possible to encode the image with high quality if there is a low risk that the occupancy of the transmission buffer will overflow. On the other hand, when the occupancy of the transmission buffer exceeds the set threshold, it is determined that the transmission buffer is at a level in which there is a high risk of overflowing. Thus, the encoding control prevents an instantaneous increase in the encoding amount to ensure that the transmission buffer does not overflow. In particular, when a rapid change occurs locally in the input video image, it is possible to maintain the accuracy of the encoded image by temporarily increasing the encoding rate to the extent of free space in the transmission buffer. Thus, it is possible to flexibly deal with the complexity of the input image and maintain high quality image encoding, while preventing the transmission buffer from being broken.

As described above, in the case a device such as an in-vehicle camera module with strong requirements for miniaturization, a large capacity memory such as DRAM may not be mounted due to a problem with power and mounting area, so that the transmission buffer should be configured with static random access memory (SRAM) in the chip. Thus, it is difficult to allocate sufficient capacity to the transmission buffer. Even in such a case, the first example can maintain the accuracy of the encoded image by generating and transmitting the encoded stream while preventing the transmission buffer from being broken.

Further, in Patent Document 1 described above, the encoder buffer should notify the buffer management unit of the output bit rate. As a result, a delay occurs and there is a problem with a lack of real time property. In addition, in Patent Document 1, the encoder buffer should communicate with the buffer management unit, so that there is also a problem with a lack of flexibility as the camera module. In order to address these problems, the buffer management unit according to the first example calculates the transmission buffer occupancy by using the transfer rate set in advance in the transmission buffer as well as the generated data amount obtained from the encoding processing unit. In this way, the buffer management unit calculates the transfer rate by using the transfer bit determination part, instead of obtaining the transfer rate each time from the transmission buffer. Thus, the need for communication with the transmission buffer is eliminated and the delay is reduced compared to the case of Patent Document 1. In addition, it is possible to flexibly deal with a system that can only have a small buffer.

Second Example

Next, a second example of the first embodiment will be described. In the first example described above, the encoding control is performed in the emergency mode once the transmission buffer occupancy exceeds the threshold, and then the encoding control is performed again in the normal encoding mode if the transmission buffer occupancy is less than the threshold. However, once the transmission buffer occupancy exceeds the threshold, the probability that the transmission buffer occupancy may exceed the threshold again is high even if the transmission buffer occupancy is below the threshold by reducing the encoding rate. In this case, the normal encoding mode and the emergency mode are repeated in a short period of time and there is room for improvement.

Thus, in the second example, two thresholds are provided for the transmission buffer occupancy. Of the two thresholds, one threshold for the case in which the transmission buffer occupancy is increased is set higher than the other threshold for the case in which the transmission buffer occupancy is reduced. In other words, a value that is greater by a predetermined value than a first threshold (th1) is defined as a second threshold (th2). The control information specifying part specifies the encoding control information based on the reception buffer occupancy until the transmission buffer occupancy exceeds the second threshold. When the transmission buffer occupancy exceeds the second threshold, the control information specifying part specifies the encoding control information that further reduces the amount of generated data than in the case of equal to or less than the first threshold. Then, when the transmission buffer occupancy is changed from a value greater than the second threshold to a value smaller than the first threshold, the control information specifying part specifies the encoding control information based on the reception buffer occupancy. In this way, by setting the threshold for the case in which the transmission buffer occupancy is increased higher than the threshold for the case in which the transmission buffer occupancy is reduced, it is possible to reduce the repetition of the encoding process between the emergency mode and the normal encoding mode.

Note that the configuration of the encoder and the like according to the second example is the same as the configuration in the first example, so that the illustration and detailed description will be omitted. However, it is assumed that two thresholds, th1<th2, are set in the threshold judgement part 122.

Figure 7:
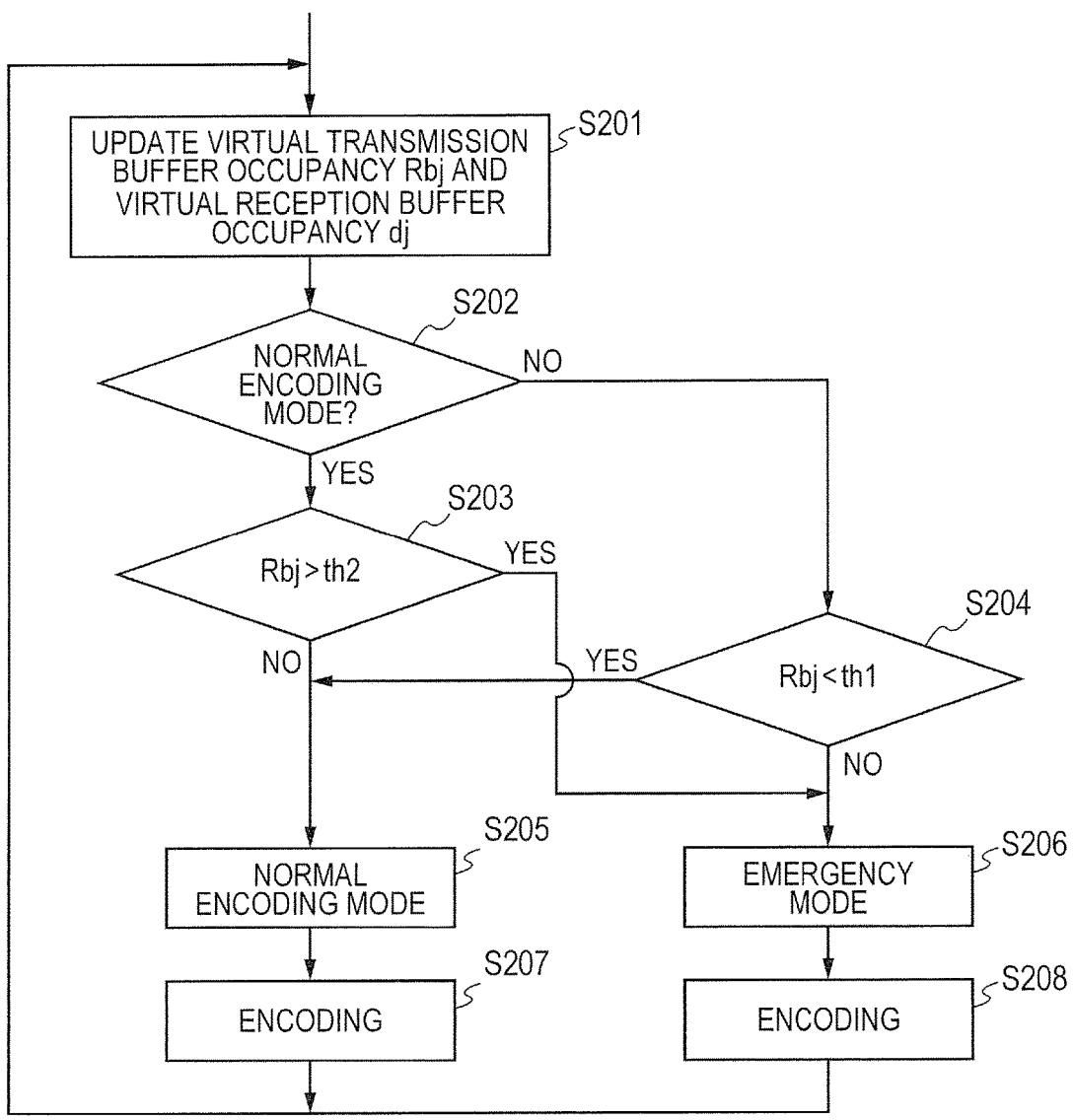
FIG. 7 is a flow chart illustrating the flow of an encoding control method according to a second embodiment.

FIG. 7 is a flow chart illustrating the flow of an encoding control method according to the second example. First, the buffer management unit 11 updates the virtual transmission buffer occupancy Rbj and the virtual reception buffer occupancy dj (S201). Next, the threshold judgement part 122 determines whether the current mode is the normal encoding mode (S202). When the current mode is the normal encoding mode (YES in S202), the threshold judgement part 122 determines whether the virtual transmission buffer occupancy Rbj is greater than the threshold th2 (S203). When it is determined that the virtual transmission buffer occupancy Rbj is equal to or less than the threshold th2 (NO in S203), the threshold judgement part 122 sets the encoding mode md to "normal encoding mode" and outputs to the encoding processing unit 13 (S205). Then, the encoding processing unit 13 encodes the input data in_data based on the quantization value Qj received from the quantization value determination part 121 (S207). On the other hand, in step S203, when it is determined that the virtual transmission buffer occupancy Rbj is greater than the threshold th2 (YES in S203), the threshold judgement part 122 sets the encoding mode md to "emergency mode" and outputs to the encoding processing unit 13 (S206). Note that it is assumed that at this time the threshold judgement part 122 holds information, such as, for example, a flag indicating that the current encoding mode md is "emergency mode". Then, the encoding processing unit 13 encodes the input data in_data based on the predetermined quantization value (S208).

Then the flow returns to step S201. In step S202, when the current encoding mode is not the normal encoding mode, namely, when the current mode is the emergency mode (NO in S202), the threshold judgement part 122 determines whether the virtual transmission buffer occupancy Tbj is smaller than the threshold th1 (S204). When it is determined that the virtual transmit occupancy Rbj is equal to or more than the threshold th1 (NO in S204), the threshold judgement part 122 sets the encoding mode md to "emergency mode" and outputs to the encoding processing unit 13 (S206). In other words, the threshold judgement part 122 maintains the emergency mode as long as the virtual transmission buffer occupancy Rbj is equal to or more than the threshold th1 even if it is smaller than the threshold th2.

On the other hand, in step S204, when it is determined that the virtual transmission buffer occupancy Rbj is smaller than the threshold th1 (YES in S204), the threshold judgment part 122 sets the encoding mode md to "normal encoding mode" and outputs to the encoding processing unit 13 (S205). In other words, once the encoding mode md is set to "emergency mode" but when the virtual transmission buffer occupancy Rbj is smaller than the threshold th1 which is smaller than the threshold th2, the threshold judgement part 122 sets the encoding mode md back to the normal encoding mode. Note that it is assumed that the quantization value determination part 121 calculates the quantization value Qj in parallel with the threshold judgement part 122.

Figure 8:
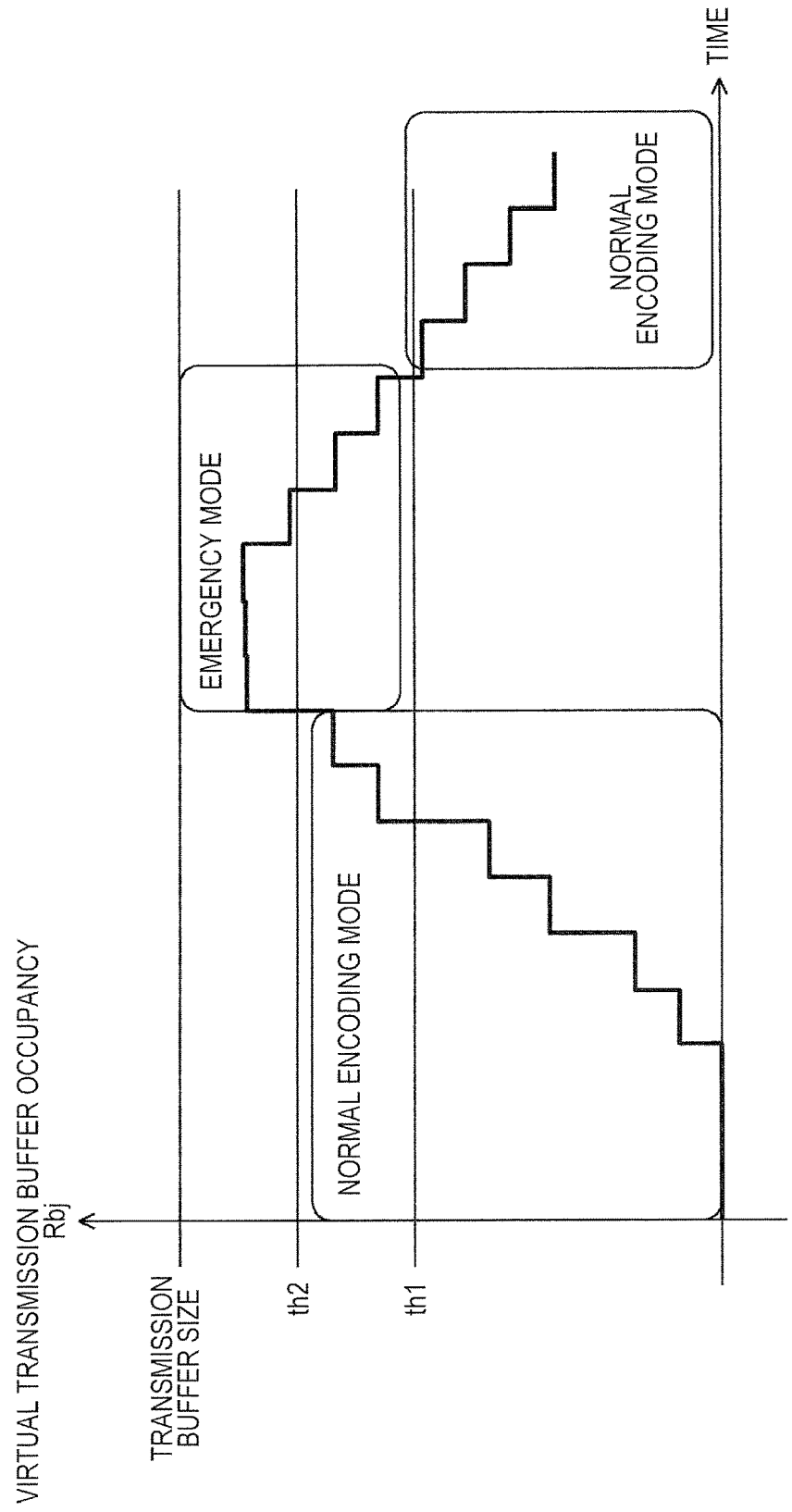
FIG. 8 is a diagram illustrating the relationship between the virtual transmission buffer occupancy and the encoding mode.

FIG. 8 is a diagram illustrating the relationship between the virtual transmission buffer occupancy and the encoding mode according to the second example. As shown in FIG. 8, initially the threshold judgement part 122 does not change the encoding mode only when the virtual transmission buffer occupancy Rbj exceeds the threshold th1, and maintains the normal encoding mode. After that, when the virtual transmission buffer occupancy Rbj exceeds the threshold th2, the threshold judgement part 122 changes the encoding mode to the emergency mode. At this time, the threshold judgement part 122 instructs the encoding processing part 13 to perform a forced encoding process to minimize the generated bit amount. Then, the encoding processing unit 13 does not perform the normal encoding process but performs the forced encoding process to minimize the generated bit amount during the time when it is instructed to perform the encoding in the emergency mode. For example, in the case of H.264, there is a method of encoding in DC mode of N×N intra MB with all coefficients set to 0, or a method of encoding as a skip MB. However, the present invention is not limited to these methods.

After that, even if the virtual transmission occupancy is reduced below the threshold th2 but when it is equal to or more than the threshold th1, the emergency mode is maintained. Then, it returns to the normal encoding mode when the virtual transmission buffer occupancy Rbj is reduced below the threshold th1.

As described above, the second threshold that is greater than the first threshold is defined as the condition to start the emergency mode. Further, the first threshold that is smaller than the second threshold is defined as the condition to terminate the emergency mode and return to the normal encoding mode. In this way, it is possible to prevent frequent repetition of the emergency mode and the normal encoding mode.

Further, by setting the second threshold to a value obtained by subtracting the amount of generated data from the size of the transmission buffer, it is possible to increase the probability to avoid the risk that the transmission buffer will be broken. For example, by setting the threshold th2 to a value obtained by subtracting the amount of generated bits in the forced encoding process, it is possible to prevent the case in which the output of the encoded stream exceeds the transmission buffer size.

Third Example

Next, a third example of the first embodiment will be described.

Figure 9:
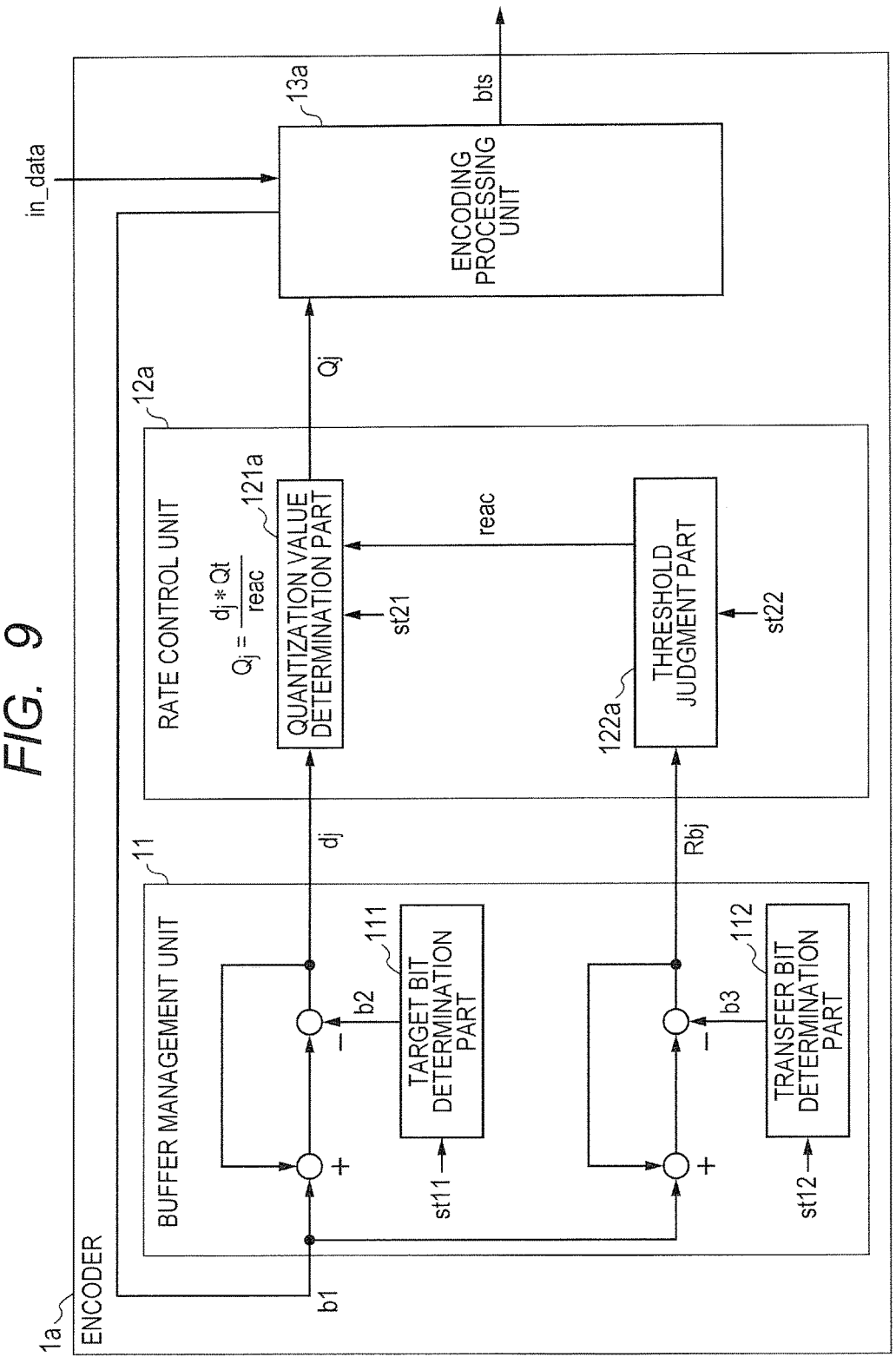
FIG. 9 is a block diagram illustrating a configuration of an encoder according to a third embodiment.

FIG. 9 is a block diagram illustrating a configuration of an encoder 1a according to a third example. Compared to the encoder 1 described above, the rate control unit 12 and the encoding processing unit 13 are replaced by a rate control unit 12a and an encoding processing unit 13a, respectively. Other configurations are the same as those in the encoder 1, so that their description will be omitted.

The rate control unit 12a includes a quantization value determination part 121a and a threshold judgement part 122a as the internal configuration. The threshold judgement part 122a outputs a reaction parameter, reac, according to the determination result, instead of outputting the encoding mode, to the quantization value determination part 121a. Further, it is assumed that two thresholds, th1a<th2a, are set in the threshold determination part 122a. For example, when the virtual transmission buffer occupancy Rbj is equal to or less than the threshold th1a, the threshold judgment part 122a outputs a predetermined reaction parameter, reacN, to the quantization value determination part 121a. When the virtual transmission buffer occupancy Rbj is greater than the threshold th1a and is equal to or less than the threshold th2a, the threshold judgement part 122a outputs a reaction parameter reac, which is 0.75 times the predetermined reaction parameter reacN, to the quantization value determination part 121a. When the virtual transmission buffer occupancy Rbj is greater than the threshold th2a, the threshold judgement part 122a outputs a reaction parameter reac, which is 0.50 times the predetermined reaction parameter reacN, to the quantization value determination part 121a.

The quantization value determination part 121a calculates the quantization value Qj by using the reaction parameter reac output from the threshold judgment part 122a as well as the virtual reception buffer occupancy dj, and outputs to the encoding processing unit 13a.

For the reasons described above, the third example can be expressed as follows. That is, when the virtual transmission buffer occupancy Rbj is greater than the first threshold (th1a) and is equal to or less than the second threshold (th2a), the rate control unit 12a specifies the encoding control information that makes the generated data amount b1 smaller than in the case of equal to or less than the first threshold, and at the same time, greater than in the case of equal to or more than the second threshold. In this way, by using the multi-state threshold, it is possible to achieve flexible encoding control.

Further, the third example can also be expressed as follows. That is, when the virtual transmission buffer occupancy Rbj is equal to or less than the first threshold (th1a), the rate control part 12a calculates the encoding control information by using the predetermined first parameter (reacN) and the virtual reception buffer occupancy dj. When the virtual transmission buffer occupancy Rbj is greater by the predetermined value (th2a) than the first threshold, the rate control part 12a calculates a second parameter (reacN*0.50) that further reduces the generated data amount b1 than in the case of the first parameter. Further, the rate control part 12a calculates the encoding control information by using the second parameter and the virtual reception buffer occupancy dj. Then, the rate control part 12a specifies the calculated encoding control information to the encoding processing part 13a. In this case, an existing device can be used for the encoding processing unit 13a. This can contribute to reduce the amount of change in the system. In addition, precise encoding control can be achieved by adjusting the parameters. Consequently, this is useful to avoid a dangerous area while minimizing the damage on the image quality.

Figure 10:
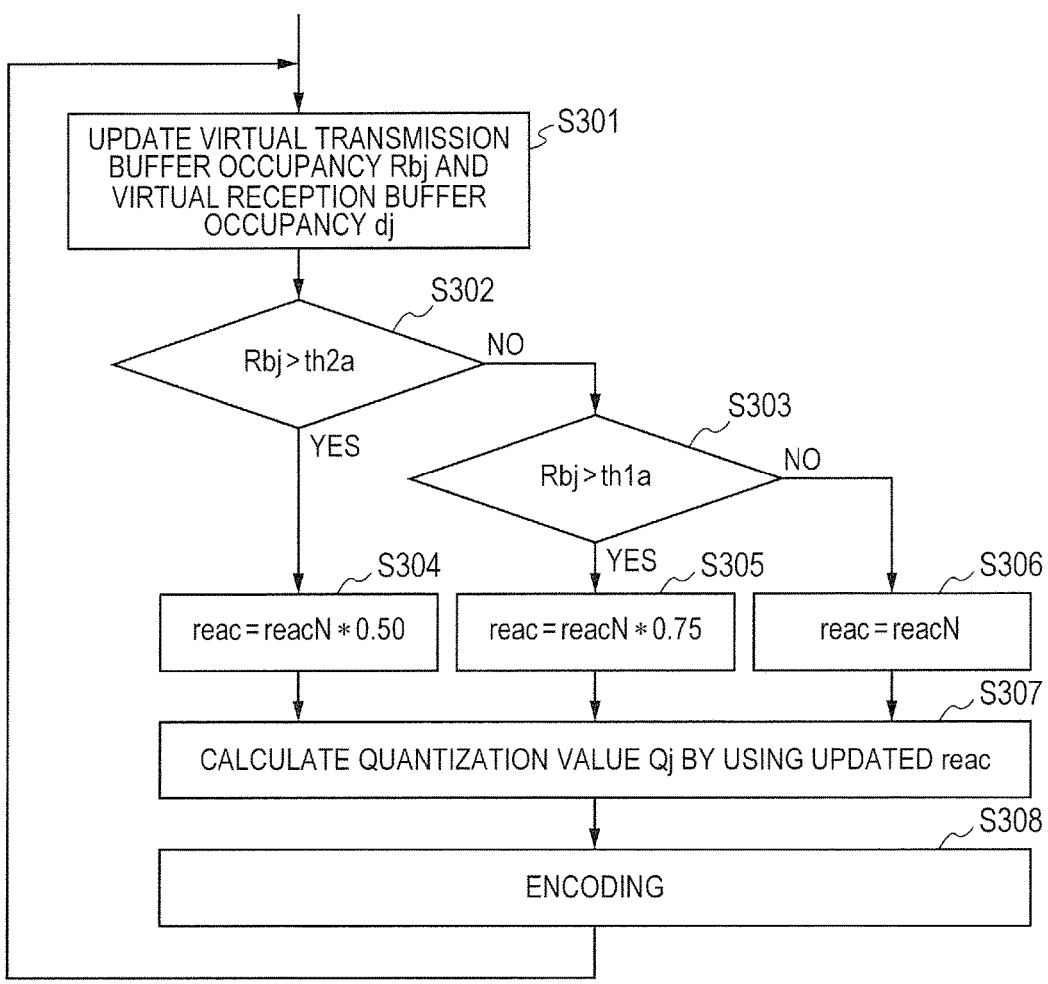
FIG. 10 is a flow chart illustrating the flow of an encoding control method according to the third embodiment.

FIG. 10 is a flow chart illustrating the flow of an encoding control method according to the third example. First, the buffer management part 11 updates the virtual transmission buffer occupancy Rbj and the virtual reception buffer occupancy dj (S301). Next, the threshold judgment part 122a determines whether the virtual transmission buffer occupancy Rbj is greater than the threshold th2a (S302). When it is determined that the virtual transmission buffer occupancy Rbj is greater than the threshold th2a (YES in S302), the threshold judgment part 122a calculates the reaction parameter reac by multiplying the specified reaction parameter reacN by 0.50, and outputs to the quantization value determination part 121a (S304).

In step S302, when it is determined that the virtual transmission buffer occupancy Rbj is equal to or less than the threshold th2a (NO in S302), the threshold judgment part 122a determines whether the virtual transmission buffer occupancy Rbj is greater than the threshold th1a (S303). When it is determined that the virtual transmission buffer occupancy Rbj is greater than the threshold th1a (YES in S303), the threshold judgment part 122a calculates the reaction parameter reac by multiplying the specified reaction parameter reacN by 0.75, and outputs to the quantization value determination part 121a (S305). In step S303, when it is determined that the virtual transmission buffer occupancy Rbj is equal to or less than the threshold th1a (NO in S303), the threshold judgement part 122a outputs the specified reaction parameter reacN as the reaction parameter reac, to the quantization value determination part 121a (S306).

After steps S304, 305, and 306, the quantization value determination part 121a calculates the quantization value Qj by using the updated reaction parameter reac received from the threshold judgment part 122a as well as the virtual reception buffer occupancy dj, and outputs to the encoding processing unit 13a (S307). After that, the encoding processing unit 13a encodes the input data in_data based on the quantization value Qj received from the quantization value determination part 121a (S308). Note that it is assumed that the quantization value determination part 121a calculates the quantization value Qj in parallel with the threshold judgment part 122a.

FIG. 11 is a diagram illustrating the relationship between the virtual transmission buffer occupancy and the encoding mode according to the third example. As shown in FIG. 11, when the virtual transmission buffer occupancy Rbj is equal to or less than the threshold th1a, the reaction parameter reac is set to the specified reacN. Further, when the virtual transmission buffer occupancy Rbj is greater than the threshold th1a and is equal to or less than the threshold th2a, the reaction parameter reac is set to reacN*0.75 to increase the quantization value Qj more than in the case of equal to or less than the threshold th1a, in order to reduce the generated bit amount. However, the generated bit amount is not reduced to the minimum value. Then, when the virtual transmission buffer occupancy Rbj is greater than the threshold th2a, the reaction parameter reac is set to reacN*0.50. In other words, the quantization value Qj is increased more than in the case of equal to or less than the threshold th2a in order to reduce the generated but amount. For example, the quantization value is set so that the generated bit amount is the minimum value.

The above method can be considered as a method of changing the reaction parameter used for the encoding control. Then, it is possible to increase the convergence speed to the target by reducing the reaction parameter. In other words, reacN*ratio1 is set when the virtual transmission buffer occupancy Rbj is greater than the threshold th1a and is equal to or less than the threshold th2a, and reacN*ratio2 is set when the virtual transmission buffer occupancy Rbj is greater than the threshold th2a. In this case, the ratio 2 is smaller than the ratio 1.

Note that the reaction parameter is updated in two stages in FIG. 11. However, the reaction parameter may also be updated in two or three, or more stages.

Further, in the second example, the encoding control is performed by adjusting the reaction parameter. However, the quantization value can directly be adjusted, instead of adjusting the reaction parameter. For example, when the virtual transmission buffer occupancy Rbj is greater than the threshold th2a, the quantization value can be made large compared to the case in which the virtual transmission buffer occupancy Rbj is equal to or less than the threshold th2a.

Note that in the above description, when the virtual transmission buffer occupancy Rbj is between the threshold th1a and the threshold th2a, the reaction parameter is set equal to reacN*ratio1 regardless of when the virtual transmission buffer occupancy Rbj increases and decreases. However, the present invention is not limited to that. For example, when the virtual transmission buffer occupancy Rbj decreases, the reaction parameter is controlled to use the normal reaction parameter reacN. In this way, the return to the normal operation can sometimes be slowed by preventing a rapid change in the quantization value and by slowing the reduction in the occupancy of the transmission buffer.

As described above, the third example is useful for the transmission buffer to avoid approaching the dangerous area where overflow will occur, while minimizing the damage on the image quality. Further, the second and third examples can be used together.

Other Embodiments

The embodiments described above can be applied, for example, to an in-vehicle camera and the like. In other words, a photographed image taken by an in-vehicle camera is required to be displayed on a screen near the driver's seat in real time, and if the display is delayed from the time of photographing, driving will be affected. Thus, a low delay is required. For this reason, the embodiments can be applied to low delay video encoding LSI as well as systems that transfer the video image such as a camera image with low delay. In particular, the embodiments can be applied to a system (an in-vehicle camera, a monitoring camera, or the like) in which a large capacity external memory, such as DRAM, may not be mounted due to a requirement for packaging for waterproof.

Further, in the embodiments described above, the present invention has been described as having a hardware configuration, but the present invention is not limited thereto. The prevent invention can also achieve an arbitrary process by allowing a processor, such as a central processing unit (CPU), to execute a computer program.

In the example described above, the program can be stored using various types of non-transitory computer readable media and supplied to a computer. The non-transitory computer readable media include various types of tangible storage media. Examples of the non-transitory computer readable media include magnetic recording media (for example, flexible disk, magnetic tape, and hard disk drive), optical magnetic recording media (for example, optical magnetic disk), CD-ROM (Read Only Memory), CD-R, DC-R/W, DVD (Digital Versatile Disc), BD (Blu-ray (registered trademark) Disc), semiconductor memories (for example, mask ROM, PROM (Programmable ROM), EPROM (Erasable PROM), flash ROM, and RAM (Random Access Memory)). Further, the program can also be supplied to the computer by various types of transitory computer readable media. Examples of the transitory computer readable media include electrical signal, optical signal, and electromagnetic wave. The transitory computer readable media can supply the program to the computer through a wired communication path such as electric wire and optical fiber, or through a wireless communication path.

The invention made by the present inventors has been specifically described based on the embodiments. However, it is needless to say that the present invention is not limited to the foregoing embodiments and various modifications and alterations can be made within the scope not departing from the gist of the present invention.

What is claimed is:

1. A semiconductor device comprising:
an encoding processing unit that stores an encoded stream of input data that is encoded based on specified encoding control information into a transmission buffer;
a buffer management unit that calculates, according to an amount of generated data in the encoding, a transmission buffer occupancy indicating an amount of data stored in the transmission buffer, as well as a reception buffer occupancy indicating an amount of data stored in a reception buffer which is a destination of the encoded stream; and
a control information specifying unit that:
when the transmission buffer occupancy is equal to or less than a first threshold, specifies the encoding control information based on the reception buffer occupancy to the encoding processing unit, and
when the transmission buffer occupancy is greater than the first threshold and is equal to or less than a second threshold that is greater by a predetermined value than the first threshold, specifies the encoding control information to make the amount of generated data smaller than in the case in which the transmission buffer occupancy is equal to or less than the first threshold, and to make the amount of generated data greater than in the case in which the transmission buffer occupancy is more than the second threshold.

2. The semiconductor device according to claim 1,
wherein when the transmission buffer occupancy is equal to or less than the first threshold, the control information specifying unit calculates the encoding control information based on the reception buffer occupancy, and specifies the calculated encoding control information to the encoding processing unit, and
wherein when the transmission buffer occupancy is greater than the first threshold, the control information specifying unit specifies a predetermined value as the encoding control information to the encoding processing unit.

3. The semiconductor device according to claim 2,
wherein the encoding control information is a quantization value.

4. The semiconductor device according to claim 1,
wherein the control information specifying unit specifies the encoding control information based on the reception buffer occupancy until the transmission buffer occupancy exceeds the second threshold,
wherein when the transmission buffer occupancy exceeds the second threshold, the control information specifying unit specifies the encoding control information to further reduce the amount of generated data than in the case in which the transmission buffer occupancy is equal to or less than the first threshold, and
wherein when the transmission buffer occupancy is changed from a value greater than the second threshold to a value less than the first threshold, the control information specifying unit specifies the encoding control information based on the reception buffer occupancy.

5. The semiconductor device according to claim 4,
wherein the second threshold is the value obtained by subtracting the amount of generated data from a size of the transmission buffer.

6. The semiconductor device according to claim 1,
wherein when the transmission buffer occupancy is equal to or less than the first threshold, the control information specifying unit calculates the encoding control information by using a predetermined first parameter and the reception buffer occupancy,
wherein when the transmission buffer occupancy is greater than the first threshold, the control information specifying unit calculates a second parameter to further reduce the amount of generated data than in the case of the first parameter, and calculates the encoding control information by using the second parameter and the reception buffer occupancy, and
wherein the control information specifying unit specifies the calculated encoding control information to the encoding processing unit.

7. The semiconductor device according to claim 1,
wherein the buffer management unit calculates the transmission buffer occupancy by using a transfer rate set in advance in the transmission buffer and by using the amount of generated data obtained from the encoding processing unit.

8. The semiconductor device according to claim 1,
wherein size of the transmission buffer is smaller than the size of the reception buffer.

9. An encoding control method comprising the steps of:
encoding a first input data based on specified encoding control information, and storing an encoded stream of the encoded first input data into a transmission buffer;
calculating, according to an amount of generated data in the encoding, a transmission buffer occupancy indicating an amount of data stored in the transmission buffer, as well as a reception buffer occupancy indicating an amount of data stored in the reception buffer which is a destination of the encoded stream;
specifying the encoding control information based on the reception buffer occupancy when the transmission buffer occupancy is equal to or less than a first threshold;
defining a value greater by a predetermined value than the first threshold as a second threshold; and
when the transmission buffer occupancy is greater than the first threshold and is equal to or less than the second threshold, making the amount of generated data smaller than in the case in which the transmission buffer occupancy is equal to or less than the first threshold, and making the amount of generated data greater than in the case in which the transmission buffer occupancy is more than the second threshold.

10. The encoding control method according to claim 9, further comprising the steps of:
when the transmission buffer occupancy is equal to or less than the first threshold, calculating the encoding control information based on the reception buffer occupancy and specifying the calculated encoding control information; and
when the transmission buffer occupancy is greater than the first threshold, specifying a predetermined value as the encoding control information.

11. The encoding control method according to claim 10, wherein the encoding control information is a quantization value.

12. The encoding control method according to claim 9, further comprising the steps of:

specifying the encoding control information based on the reception buffer occupancy until the transmission buffer occupancy exceeds the second threshold;
when the transmission buffer occupancy exceeds the second threshold, specifying the encoding control information to further reduce the amount of generated data than in the case in which the transmission buffer occupancy is equal to or less than the first threshold; and
when the transmission buffer occupancy is changed from a value greater than the second threshold to a value smaller than the first threshold, specifying the encoding control information based on the reception buffer occupancy.

13. The encoding control method according to claim 12,
wherein the second threshold is the value obtained by subtracting the amount of generated data from a size of the transmission buffer.

14. The encoding control method according to claim 9, further comprising the steps of:
when the transmission buffer occupancy is equal to or less than the first threshold, calculating the encoding control information by using a predetermined first parameter and the reception buffer occupancy;
when the transmission buffer occupancy is greater than the first threshold, calculating a second parameter to further reduce the amount of generated data than in the case of the first parameter, and calculating the encoding control information by using the second parameter and the reception buffer occupancy, and
specifying the calculated encoding control information.

15. The encoding control method according to claim 9, further comprising the step of calculating the transmission buffer occupancy by using a transfer rate set in advance in the transmission buffer and by using the amount of generated data.

16. The encoding control method according to claim 9,
wherein a size of the transmission buffer is smaller than a size of the reception buffer.

17. A camera device comprising:
an encoding processing unit that encodes an input data based on specified encoding control information;
a transmission buffer that stores an encoded stream of the encoded input data;
a buffer management unit that calculates, according to an amount of generated data in the encoding, a transmission buffer occupancy indicating an amount of data stored in the transmission buffer, as well as a reception buffer occupancy indicating an amount of data stored in a reception buffer; and
a control information specifying unit that:
specifies the encoding control information based on the reception buffer occupancy when the transmission buffer occupancy is equal to or less than a first threshold, and
when the transmission buffer occupancy is greater than the first threshold and is equal to or less than a second threshold that is greater by a predetermined value than the first threshold, specifies the encoding control information to make the amount of generated data smaller than in the case in which the transmission buffer occupancy is equal to or less than the first threshold, and to make the amount of generated data greater than in the case in which the transmission buffer occupancy is more than the second threshold.

* * * * *